United States Patent Office 2,987,441
Patented June 6, 1961

2,987,441
DEBITTERING ANION-EXCHANGE RESIN PARTICLE SURFACES OF PENICILLIN ANIONS, AND TASTELESS RESIN PARTICLES OF PENICILLIN
Norman Brudney, L'Abord a Plouffe, Quebec, Canada, assignor to Frank W. Horner Limited, Montreal, Quebec, Canada
No Drawing. Filed Feb. 12, 1959, Ser. No. 792,720
Claims priority, application Canada Nov. 14, 1958
8 Claims. (Cl. 167—65)

This invention relates to a novel penicillin preparation for oral administration, a process for producing this preparation, and pharmaceutical compositions containing it. The ideal type of oral penicillin preparation should embody a number of advantages. Firstly, the preparation itself must be stable for long periods, since with present-day production and marketing procedures, there may be as much as a two year period between the time of manufacture, and the time of use by a patient. Secondly, the preparation must give effective release of penicillin for absorption from the gastro-intestinal tract over long periods. If this release can be made to take place over long periods of time, a preparation which will be long acting will have been effected, and the frequency with which doses must be taken to maintain a sufficiently high blood level will be reduced. Thirdly, the preparation should preferably be tasteless, or presented in a pleasant tasting form, especially if the medicament is to be readily acceptable to all patients, including young children.

It is an object of the present invention to provide a penicillin preparation which has an unobjectionable taste. Until the present time, large doses of penicillin that had to be administered per os were given in one of several forms, either as a hard gelatin capsule or as a suspension or solution or as a tablet. Penicillin is, by its nature, a bitter and malodorous substance, presenting a considerable problem to the pharmaceutical chemist in the presentation of a pleasant tasting, readily acceptable liquid form, and entails the admixture of a number of sweetening and flavouring agents to overcome the bitterness and objectionable nature of the drug. No really successful method of achieving this aim was known to the present inventor before the discovery of the composition described herein. The administration of large hard gelatin capsules is further not readily acceptable to the sick adult patient, and less so to the sick child. The penicillin preparations of the present invention overcome the need for hard gelatin capsules.

A further object of the present invention is to describe a preparation of penicillin from which the drug is slowly released by the action of the gastric or intestinal juices. Older methods of obtaining this slow release were largely based on coating the drug with a variety of materials, and to a varying extent. These materials were slowly eroded by the gastric or intestinal juices. These methods, however, are not entirely reliable and depend for their success on many factors which vary from one individual to another, such as the pH of the gastro-intestinal tract, the motility of the digestive tract and, length of time long acting form is retained in various regions of the digestive tract. Further, since coating is by its nature an empirical process, considerable variation between different batches is observed, and the rate of release of the drug can be effected by factors introduced, but difficult to control, during the coating process. The penicillin preparations of the present invention are capable of releasing the drug slowly over long periods, and to a great extent, independently of the many variable physiological factors mentioned above.

The present invention provides a process for the manufacture of a penicillin preparation comprising bringing a solution of a salt of a penicillin into contact with a non-toxic anion exchange material thereby causing adsorption of the anion of the penicillin on the anion exchange material. Any soluble salt of penicillin may be used. Also, the invention is applicable to any type of penicillin, e.g., penicillin V (Phenoxy-methyl-penicillin) and penicillin G (benzyl-penicillin).

It is found that the penicillin preparation of the invention, which comprises a non-toxic anion exchange resin having adsorbed thereon the anion of a penicillin, tastes and smells of penicillin to a barely perceptible extent. What little residual taste and odour it does have can, if desired, be removed by a short after-treatment with a solution of an electroylte, e.g., strong saline, to remove penicillin from the surface of the anion exchange material, and subsequent vacuum drying. The vacuum drying is effected because penicillin is not stable in the presence of water. Accordingly, the invention further provides a process for the manufacture of a penicillin preparation, comprising bringing a solution of a salt of a penicillin into contact with a non-toxic anion exchange material thereby causing adsorption of the penicillin anion on the anion-exchange material, then subjecting said anion-exchange material to the action of a solution of an electrolyte to remove adsorbed penicillin anion from the surface of the anion-exchange material, washing the anion exchange material free from said electrolyte and vacuum drying.

There are many commercially available anion exchange materials suitable for use in the present invention. Of prime interest are the well known synthetic anion exchange resins, particularly those of the polyamine type. Such resins include, for example, the following:

Amberlite (trade name), IRA 400 or IRA 401 or IR 4 B (Rohm & Haas Co., U.S.A.)
De-Acidite (trade name) FF or E (Permutit Co., U.K.)
Dowex (trade name) 1 and 2 (Dow Chemical Co., U.S.A.)

The Amberlite resins are especially useful; a suitable resin such as IRA 401 has been described in U.S. Patent No. 2,591,573 as being the hydrolysed reaction product of a tertiary amine, such as trimethyl amine and an insoluble haloalkylated cross-linked copolymer of an aromatic monovinyl hydrocarbon such as styrene and an aromatic divinyl hydrocarbon such as divinylbenzene. The copolymer of styrene and divinylbenzene is chloromethylated by its treatment with a mixture of paraformaldehyde and hydrochloric acid with aluminum chloride. Alternatively, naturally occurring anion exchange materials such as the apatites or kaolinites may be used.

The process of the invention may be carried out as follows:

An anion-exchange material of a non-toxic nature is prepared into the form of a column. This is readily achieved by preparing a slurry of ion exchange material, with distilled or demineralised water and pouring this slurry into a glass pipe provided with a porous fitted glass plate at its bottom and a suitable stopcock or valve.

A solution of, for example, penicillin V or G potassium salt of suitable strength, is prepared and run through the column of ion exchange material at a suitable speed such that the effluent solution does not exceed one-twentieth part of the concentration of the affluent solution. Fresh affluent solution is continually added until the concentration of penicillin V in the effluent solution begins to show a marked rise in concentration. The bed is then washed copiously with distilled or demineralised water, removed from the column and allowed to air dry. The air dried material is then suspended in a solution of 5% sodium chloride for a short period, again washed well with distilled or demineralised water, and dried under vacuum. The surface washing step is especially advantageous in the preparation of a tasteless form of penicillin, for it ensures that the surfaces of the resin particles are free of penicillin. This ensures that no penicillin is released in the mouth or buccal cavities from the surfaces of the resin particles on immediate contact with the saliva.

The long acting effect, which as stated above, is largely independent of pH, nature of the cation, motility of the gut, etc., has been demonstrated in vitro by a method similar to that described by Chaudhry, N. C., and Saunders, L., Journal of Pharmacy and Pharmacology 8, 975 (1956). The drug complex was suspended in 25 cc. of hydrochloric acid of varying strengths, in closed tubes, and the tubes rotated. After various time periods, the solution in each tube was removed from the resin, assayed and replaced with fresh solution. The results are shown in the accompanying Table I, and are expressed as a percentage of the total amount available from the complex if it were completely eluted.

Table I.—Percentage of total penicillin available from complex within various time periods

|  | 0–½ | ½–1½ hours | 1½–2½ hours | 2½–3½ hours | 3½–4½ hours | 4½–5½ hours |
| --- | --- | --- | --- | --- | --- | --- |
| N/5 HCl | 14.8 | 16.7 | 15.8 | 13.3 | 11.0 | 10.0 |
| N/10 HCl | 10.8 | 12.1 | 12.0 | 10.4 | 8.7 | 7.6 |
| N/20 HCl | 9.9 | 10.0 | 10.3 | 8.6 | 7.9 | 6.8 |

Thus over a range of acid concentration from N/5 to N/20 HCl there is little difference in the rate of release of the adsorbed drug from the resin; this is important because pH values within the stomach and gut vary widely from one individual to another and this has rendered uncertain the degree of control obtainable by the known coating procedures. The motility of the gut has little or no effect on the rate of release of drug, since the resin particles are not fractured in the gut, and in any case release of drug is not dependent on the fracturing of the particle or on dissolving a coating. The rate of release is dependent on the processing of the resin, i.e., how much drug is removed from the particles during washing, the particle size of the resin, the temperature during elution of the drug and the degree of cross linking of the resin. Since all of the latter factors are readily controlled, a reliable long acting form of a penicillin can be produced by preparing it in the form of an ion exchange resin complex.

The effect of the degree of cross-linking of the resin on the rate of release of penicillin from a complex may be seen by a comparison of Tables II and III.

Table II.—Rate of release in mgms./hour of adsorbed penicillin from 2% cross-linked resin (Amberlite IRA 401)

|  | ½ hour | 1½ hours | 2½ hours | 3½ hours | 4½ hours | 5½ hours |
| --- | --- | --- | --- | --- | --- | --- |
| N/5 HCl | 29.4 | 21.4 | 20.0 | 17.0 | 14.0 | 10.0 |
| N/10 HCl | 22.0 | 17.5 | 15.7 | 13.7 | 12.0 | 9.3 |
| N/20 HCl | 17.0 | 14.3 | 12.5 | 11.0 | 10.7 | 8.0 |

Table III.—Rate of release in mgms./hour of adsorbed penicillin from 15% cross-linked resin (Amberlite IRA 400)

|  | ½ hour | 1½ hours | 2½ hours | 3½ hours | 4½ hours | 5½ hours |
| --- | --- | --- | --- | --- | --- | --- |
| N/5 HCl | 43.0 | 22.0 | 19.7 | 13.7 | 8.7 | 6.5 |
| N/10 HCl | 38.0 | 18.0 | 14.3 | 10.3 | 7.0 | 6.0 |
| N/20 HCl | 32.0 | 15.0 | 10.0 | 7.7 | 6.3 | 6.0 |

It can be seen that the rate of release from a highly cross-linked resin decreases more rapidly than from a resin containing less cross-linkages.

A normal dosage form of penicillin V should give the patient up to 500,000 I.U. of penicillin at one time. Since the resin contains approximately 40% w./w. penicillin and penicillin V contains 500,000 I.U. in 294 mg., about 1.0 g. of resin complex must be administered at one time. This amount would make an unwieldy tablet or wafer, and would not be acceptable to some patients. However, pharmaceutical compositions may be prepared by admixing penicillin preparations of the invention with pharmaceutical vehicles, and it is a feature of the invention to admix a penicillin preparation of the invention with an acceptable sweetened and flavoured base, so that the resulting composition can be sucked, chewed, or swallowed by any patient, and is readily acceptable to adults and children alike.

The following examples are given by way of illustration and are not to be regarded as limitations of this invention, many variations of which are possible without departing from the spirit or scope thereof.

EXAMPLE I 500 g. of commercial Amberlite IRA 401 ion exchange resin in the chloride form −16 +40 mesh, were suspended in 500 cc. of distilled water and prepared into a column 6 cms. in diameter and 50 cms. in length. 2 l. distilled water were passed through the column. 50 l. of a solution of penicillin V, potassium salt, 0.5% w./v. were passed through the column at a rate not exceeding 60 cc. per minute. The total effluent solution was collected and the amount of unadsorbed penicillin V determined. The resin was then suspended in 2 l. distilled water and washed free of unadsorbed penicillin. The resin complex was then air dried at room temperature (18–20° C.) for 24 hours and suspended in 2 l. of N/10 NaCl. The resin complex was again washed in 2 l. distilled water and vacuum dried. The dry resin was assayed for penicillin activity by elution to exhaustion with 5% sodium chloride solution, followed by microbiological determination of the penicillin activity contained in the eluate. The resin was found to contain 44.6% w./w. penicillin V and was stored in glass sealed containers until required.

EXAMPLE II

A product similar to that described in Example I, but using Amberlite IRA 400. 88 l. of a solution of penicillin V, potassium salt, 0.25% w./v. were passed through the column at a rate not exceeding 40 cc. per minute. This resin was found by a similar method to that outlined in Example I to contain 37.65% w./w. penicillin V.

EXAMPLE III

A product similar to that described in Example I was prepared by a similar method except that penicillin G was employed. 100 l. of a solution of penicillin G, potassium salt, 0.18% w./v. was passed through a column of Amberlite IRA 401 at a rate not exceeding 60 cc. per minute. This resin was found to contain 41.6% w./w. penicillin G by a method similar to that described in Example I.

EXAMPLE IV

A product similar to that described in Example I was prepared by a similar method except that penicillin G was employed. 50 l. of a solution of penicillin G, potassium salt, 0.18% w./v. were passed through a column of Amberlite IRA 400 at a rate not exceeding 30 cc. per minute. This resin was found to contain 13.1% w./w. penicillin G by a method similar to that described in Example I.

EXAMPLE V

The following ingredients were mixed together and heat treated to make a suitable cocoa butter mix by methods well known in the art.

|  | G. |
|---|---|
| Sucrose | 276,500 |
| Skim milk powder | 79,900 |
| Sodium chloride | 0.934 |
| Cocoa butter | 175.600 |
| Lecithin (commercial grade) | 0.822 |
| Vanillin | 0.087 |

Immediately before pouring the mix into suitable molds, 90.2 g. of the resin complex as described in Example I was added, and the whole well mixed together. The mixture was poured into molds, so that each mold contained exactly 0.22 oz. of mix. Each cube, so obtained, contained 500,000 I.U. penicillin plus a further 125,000 I.U., in excess, to allow for any loss of activity over the storage period of the finished products. The cubes could be ingested with pleasure and gave no bitter after-taste.

EXAMPLE VI

A composition was prepared similar to that described in Example IV, but incorporating cocoa powder to give the finished composition a chocolate-like flavour and appearance.

Prior to the present invention it has been proposed to administer certain other pharmaceuticals in the form of preparations produced by adsorbing them on ion exchange resins. However, it could not have been predicted that penicillin preparations of the invention would be sufficiently stable as they have in fact been found to be. Furthermore, the present invention not only provides a solution to the long standing problem of formulating penicillin for oral administration in a form which is not distasteful but also makes it possible to regulate to a substantial extent the rate of release of the penicillin within the body. The rate of release of the penicillin is dependent on the surrounding concentration of anion, e.g., the chloride ion, but the increase in the rate of release with increasing anion concentration falls off rapidly; it is for this reason that quite large changes of pH over the pH range encountered in the body have comparatively little effect on the rate of release of the penicillin. As indicated above, variation of the degree of cross-linking of the resin enables the rate of release of penicillin to be varied.

I claim:

1. A process for the manufacture of a tasteless penicillin preparation comprising contacting substantially tasteless, non-toxic anion-exchange resin particles with a solution of an objectionable tasting anionic penicillin salt until penicillin anions are ion-exchanged for anions of the resin, then suspending said resin particles in a solution of a saline electrolyte having substantially tasteless anions which ion-exchange with the penicillin anions of the resin until such substantially tasteless anions have displaced the penicillin anions from the surfaces of said resin particles and rendered said surfaces substantially tasteless, washing said particles free from objectionable tasting penicillin anions and from said electrolyte, and drying said particles.

2. The process of claim 1 wherein said electrolyte is sodium chloride.

3. The process of claim 1 wherein said drying is accomplished by vacuum drying.

4. An integral particle of a non-toxic substantially tasteless anion-exchange resin, said particle being composed of a substantially uniform cross-section of said resin, the inner region of said integral resin particle having penicillin anions absorbed thereon and the outer region of said integral particle being substantially tasteless and free of penicillin anions.

5. Particles as defined in claim 4 wherein said penicillin anion is the anion of penicillin V.

6. Particles as defined in claim 5 wherein said anion-exchange resin is a synthetic polyamine anion exchange resin.

7. Particles as defined in claim 4 wherein said penicillin anion is the anion of penicillin G.

8. Particles as defined in claim 7 wherein said anion-exchange resin is a synthetic polyamide anion exchange resin.

References Cited in the file of this patent

UNITED STATES PATENTS

| 2,629,710 | McBurney | Feb. 24, 1953 |
| 2,656,298 | Loewe | Oct. 20, 1953 |
| 2,673,827 | Kohlstaedt | Mar. 30, 1954 |
| 2,689,227 | McBurney | Sept. 14, 1954 |